Patented Apr. 15, 1947

2,418,816

UNITED STATES PATENT OFFICE 2,418,816

BLACK SULFUR DYES AND PROCESSES FOR MANUFACTURING THE SAME

Newell M. Bigelow, Wilmington, Del., assignor to E. I. du Pont de Nemours & Company, Wilmington, Del., a corporation of Delaware No Drawing. Application April 13, 1944, Serial No. 530,944

5 Claims. (Cl. 260—137)

This invention relates to improved black sulfur dyes, and especially to means for improving such dyes which result from the thionation of di- or tri-nitro-phenols or mixtures thereof.

The manufacture of black sulfur dyes resulting from the thionation of di- or tri-nitro-phenols or mixtures thereof by the action of thionating agents such as sodium polysulfide is well known to the art. In the manufacture of such dyes the di-nitro-phenols are often used as the basic intermediate and the shades may be modified by having present a mono-nitro-phenol which produces greener blacks or by having picric acid present which produces redder blacks. Such black sulfur dyes can also be made by thionating picric acid alone. The intermediate quite commonly used is the di-nitro-phenol derived by hydrolyzing dinitro-chloro-benzene by the action of sodium hydroxide. For making sulfur dyes, it is immaterial whether or not the alkali metal phenolate or the phenol is used for thionation. The di-nitro-phenolate thus produced consists mainly of alkali 2,4-dinitrophenol, although other dinitro-phenols are usually present in small and varying amounts. The thionation is effected in aqueous medium by the action of a polysulfide, such as sodium polysulfide, with heating until the reaction is completed or further heating does not increase the yield of dye. The hot or heated thionation mixture is then aerated, thereby oxidizing the dye to its water-insoluble form and any residual polysulfide to the thiosulfate and sulfur. The dye thus precipitated is then separated from the reaction medium and given any further treatment which may be desired, such as working it into flakes or powder and drying.

The black sulfur dyes thus prepared by thionating and thereafter aerating the intermediates referred to are valuable and widely used dyestuffs in commercial dyeing, but they are not entirely satisfactory in that they do not have good exhaust properties. Consequently a great deal of dye is lost in the discarded dyebaths which have reached their limit of exhaustion. Poor exhaust of the dyebath is especially wasteful of dye where the dyeing is performed in dyeing machines. In such machine operations, a smaller volume and a more highly concentrated dyebath is used than is customarily used in open-tub dyeing, and the dyeing and rinsing of the dyed fiber is carried out substantially in the absence of air or with a greatly restricted access to air. These conditions unfavorably influence any weakness in the exhaust properties of the dyes. In both methods of dyeing the relative loss of dye is consequently great and means are desired to avoid such losses.

One of the objects of the present invention is to improve the black sulfur dyes of the kind described with respect to their exhaust properties. Other objects of the invention will be apparent from the following description.

The objects of the invention are attained in general by treating the dye in suspension in aqueous medium with a cyanogen compound after the thionated product is transformed into its oxidized water-insoluble form. The effect may be conveniently produced by adding to the suspension an alkali metal cyanide, such as sodium cyanide, but other cyanogen compounds can be used. Treatment with only a relatively small proportion of the cyanogen compound per unit of dye is essential.

In general the di-nitro-phenol intermediate alone or in admixture with mono-nitro-phenol, or the picric acid intermediate, or a mixture of these intermediates is thionated by any of the methods known to the prior art. When the thionation is complete and all of the intermediate has been converted to the black sulfur dye, the reaction mixture is transferred to a kettle or tub, and air is blown through it at elevated temperature until the excess polysulfide has been converted to sodium thiosulfate or free sulfur, and the crude dye has been precipitated in its water-insoluble oxidized form. At this point, an amount of sodium cyanide varying from about 0.1 to about 0.6 part by weight (or an equivalent of a cyanogen compound hereinafter to be pointed out) per part of the sodium phenolate used in the thionation is added, and the mixture is agitated preferably until a maximum improvement in the exhaust property of the dye is attained.

In this treatment it is desirable to treat with about 0.1 part of the cyanide and then subsequently treat with additional small portions until the desired improvement in exhaust is attained. A maximum of about 0.6 part of sodium cyanide or its equivalent has been found to be sufficient depending upon the prior treatment of the thionated product. When the necessary amount of treating agent for a maximum improvement in exhaust for a given thionated intermediate has been determined, all of the treating agent may be added at once, but in all cases it is generally preferable to add the cyanide in portions since somewhat more effective results are attained by piecemeal additions of an optimum amount of cyanide. It is usually advisable to continue the passage of air through the reaction mixture during the cyanide treatment, although this is not an essential feature of the invention.

The progress of the improvement in the exhausting properties of the dye may be determined by control tests. Control tests are performed by removing a sample of the reaction mixture, filtering it, dissolving it in the required amount of sodium sulfide solution and dyeing several cotton skeins in succession from this dye bath. As the exhaust improves, the first dyeing from the bath will be increasingly stronger, and the succeeding dyeings increasingly weaker, since the dye will exhaust more completely on the first dyed skein. In order to attain maximum improvement without having present a harmful excess of treating agent, the addition of several small portions of the treating agent with subsequent heating and agitation is advantageous until further additions no longer cause an improvement in the exhausting properties of the dye. The treated product is then separated from the mother liquors by filtration or decantation, and it is then ready for any of the isolation and finishing procedures which are useful in the manufacture of sulfur dyes.

The invention will be more fully set forth in the following more detailed description which includes examples that are given as illustrative embodiments of the invention and not as limitations thereof. Parts are expressed in parts by weight unless otherwise noted.

Example I

An aqueous suspension of 100 parts of technical dinitro-chloro-benzene was hydrolyzed with slightly more than the amount of aqeous sodium hydroxide solution theoretically required. The solution of sodium dinitro-phenolate so produced was thionated by refluxing with an aqueous solution of sodium polysulfide equivalent to 73 parts of 100% sodium sulfide and 96 parts of sulfur. When the thionation of the intermediate was complete, the thionation mass was transferred to an open kettle and reheated to 90° C. A vigorous stream of air in finely divided bubbles was passed through the solution at this temperature until all of the excess sodium polysulfide has been converted to sodium thiosulfate or free sulfur, and all of the dye had been converted to its water-insoluble, oxidized form. The resulting suspension was filtered. The filter cake was washed with water until the washings became dark in color; then the cake was resuspended in 1000 parts of water.

The latter suspension was heated to 90° C.; at this temperature, 7 parts of sodium cyanide were added, and the passage of air through the suspension was resumed. The aeration was continued for three hours; after one hour and again after two hours, 7 parts more of sodium cyanide were added to the mixture. At the end of three hours' treatment, the dye was filtered from the mother liquors. The crude dye was processed into the form of flakes or grains by drying with sodium sulfide according to the method described in U. S. P. 2,125,981.

Example II

One hundred parts of technical dinitro-chloro-benzene was hydrolyzed in aqueous suspension with a very slight excess over the amount of sodium hydroxide theoretically required. The sodium dinitro-phenolate so prepared was thionated with aqueous sodium polysulfide solution equivalent to 73 parts of 100% sodium sulfide and 96 parts of sulfur. When thionation was complete, the thionation mass was transferred to an open kettle and diluted with water to a total weight of approximately 1500 parts. The temperature of the mixture was adjusted at 75° C.; a brisk current of air was passed through the suspension until all of the residual polysulfide had been converted to sodium thiosulfate or free sulfur and the dye had been oxidized to its water-insoluble form. At this point, 15 parts of sodium cyanide was added, and the aeration was continued at 75° C. After two hours, a second addition of 15 parts of cyanide was made, and after four hours a third addition of 15 parts cyanide. The combined aeration and cyanide treatment was continued until six hours had elapsed from the first addition of the cyanide. At the end of this time, agitation, heating and the passage of air through the suspension were stopped, and the dye was allowed to settle from the mother liquors. The supernatant liquor was dawn off; the paste of dye remaining was suitable for conversion to standardized dye by any of the commonly used finishing processes.

Example III

One hundred parts by weight of technical dinitro-chloro-benzene were converted to an aqueous solution of sodium dinitro-phenolate by the method described in Example I. To this solution was added 3.6 parts of p-nitro-phenol and just enough of an aqueous solution of sodium hydroxide to convert the nitro-phenol to its sodium salt without leaving an excess of free caustic. The resulting solution was added slowly to a hot aqueous solution of sodium polysulfide equivalent to 70 parts of 100% sodium sulfide and 102 parts of sulfur. The resulting mixture was thionated for approximately 18 hours. It was then transferred to an open tub, diluted with water to a total weight of 1000 parts, and aerated at a temperature of 90° until all of the sodium polysulfide remaining in the mixture had been converted to thiosulfate or free sulfur and the dye had been precipitated in its insoluble oxidized form. Then the passage of air through the mixture was discontinued; 40 parts of sodium cyanide were added to the mixture, and it was agitated at 90°, without aeration, until dye tests on small samples indicated that the full improvement in exhausing properties had been achieved. The dye was then separated from the mixture by filtration or decantation and converted to a standardized condition by any of the methods commonly used for the finishing of black sulfur dyes.

Example IV

One hundred parts of technical dinitro-chlorobenzene was converted to the sodium salt of dinitro-phenol by the method described in Example I. To this solution was added 12.5 parts of picric acid and 2.2 parts of sodium hydroxide. This mixture was thionated with aqueous sodium polysulfide equivalent to 76 parts of 100% sodium sulfide and 101 parts of sulfur. When the thionation was complete, a concentrated aqueous solution of 15 parts of sodium sulfite was added, and the mixture was refluxed for one hour; then it was aerated at 90°–100° until the dye had been precipitated in its oxidized form. The crude dye was separated from the mother liquors by decantation. Eight hundred parts of water and 20 parts of sodium carbonate were added to the dye paste. The suspension was agitated, heated to 90° and held at this temperature for 6 hours. Aeration was resumed. Twenty parts of sodium cyanide were added as soon as the suspension reached 90°; two more additions of 20 parts of cyanide were made after two and four hours, respectively. When the treatment was completed, the dye was separated from the mother liquors by filtration or decantation and finished by any one of the various commonly used methods.

About 0.1 part of an alkali metal cyanide or its equivalent in the form of thiocyanate or an alkaline earth cyanide per part of alkali metal phenolate thionated is sufficient to produce the improved result, but as much as about 1.0 part of alkali metal cyanide or its equivalent may be used without harmful effect. The use of more than about 1.0 part of the sodium cyanide or its equivalent is deleterious in that an excess of the treating agent decreases the yield of finished dye and may impair the exhausting properties.

The optimum temperature range for the cyanide treatment lies between about 65° C. and the boiling point of the reaction mixture. The reaction mixture may be heated to temperatures below 65°, but the reaction proceeds more slowly. In the indicated ranges of temperature and concentration, the treatment usually is complete in between four to eight hours but the duration of treatment for maximum improvement varies to some extent with different reaction media.

The sodium thiosulfate originally present in the blown thionation mass may be, but need not be, removed by filtration or decantation before the start of the cyanide treatment. A given amount of cyanide is more effective in the absence of thiosulfate than in its presence; however, the difference in effectiveness brought about by the presence of thiosulfate is not marked, and the amounts of cyanide which have been specified are sufficient to bring about the desired improvement in exhausting properties even in the presence of the amounts of thiosulfate commonly found in blown thionation masses.

Ordinarily, the normal degree of alkalinity of the blown thionation mass is satisfactory. If necessary, sodium carbonate or any other alkali may be added until the suspension is mildly alkaline. The term "mildly alkaline" as used in the specification and claims means weakly alkaline to phenol-phthalein indicator paper or a pH value of about 8 to 9.5. The medium should not be neutral or acid.

The described treatment of sulfur black dyes derived from dinitro-phenols, picric acid or mixtures of these intermediates, with or without mono-nitro-phenols being present, improves the exhaust of the dyes, and it also reddens the shade of the dyes considerably. Black sulfur dyes rich in thionated picric acid have reddish shades of black but they are inherently inferior in exhaust properties. Thus by applying the present invention, dyes in given shades of reddish black can be produced which have superior exhaust properties.

When a cyanide is added to an aqueous suspension of the dye as hereinbefore described, tests for the cyanide ion made soon after the addition thereof do not identify this constituent but the presence of thiocyanates can be identified. It has been found that alkali metal thiocyanate salts have the same effect as the alkali metal cyanides and they may be used instead of the alkali metal cyanides in amounts which are molecularly equivalent thereto. Any of the alkaline earth cyanides containing an equimolecular amount of cyanide ion have the same effect in the described process and can also be used instead of sodium cyanide. It is, however, preferable to use the alkali metal cyanides since they do not form water-insoluble compounds with sulfides, thiosulfates or adventitious ions which are likely to be present in the treating medium. When the insoluble form of the dye is thoroughly washed and suspended in a weak alkaline water solution, the alkaline earth cyanides, for example, can be used with good success instead of the alkali metal cyanides.

From the foregoing disclosure it will be recognized that the invention is susceptible of modification without departing from the spirit and scope thereof and it is to be understood that the invention is not restricted to the specific illustrations thereof herein set forth.

I claim:

1. In the manufacture of black sulfur dyes produced by thionating an intermediate of the group consisting of di-nitro-phenols, picric acid, mixtures of di-nitro-phenols with picric acid and mixtures of said intermediates containing mono-nitro-phenols and converting the product of thionation to its water-insoluble form by the action of an oxidizing agent in aqueous medium; the step which comprises adding a treating compound of the group consisting of alkali metal cyanides, alkaline earth cyanides and alkali metal thiocyanates to a mildly alkaline aqueous suspension of said water-insoluble form of the dye, heating the suspension and subjecting the same to the action of said treating compound until the exhaust property of the dye is increased, said compound being added to said suspension in an amount equivalent to about 0.1 to about 1.0 part of active sodium cyanide to 1 part of the intermediate thionated.

2. The process in accordance with claim 1 in which the treating compound is a cyanide.

3. The process in accordance with claim 1 in which the treating compound is an alkali metal cyanide.

4. The process in accordance with claim 1 in which the treating compound is sodium cyanide.

5. A black sulfur dye made by thionating an intermediate of the group consisting of di-nitro-phenols, picric acid and mixtures thereof with mono-nitro-phenols, converting the thionated product to its insoluble form by the action of an oxidizing agent in aqueous medium and then treating the resulting compound while suspended in a heated mildly alkaline water solution with a treating agent of the group consisting of alkali cyanides, alkaline earth cyanides and alkali metal thiocyanates until the exhaust properties of the product are greater than that of said insoluble form, said treating agent being added to said suspension in an amount ranging from that which is equivalent to about 0.1 part to about 1.0 part of sodium cyanide per part of intermediate thionated.

NEWELL M. BIGELOW.

REFERENCES CITED

The following references are of record in the file of this patent:

UNITED STATES PATENTS

| Number | Name | Date |
|---|---|---|
| 655,659 | Priebs et al. | Aug. 7, 1900 |
| 904,224 | Piorrier | Nov. 17, 1908 |
| 1,909,162 | Barnhart | May 16, 1933 |
| 1,609,927 | Wutke et al. | Dec. 7, 1926 |
| 1,809,318 | Spengler et al. | June 9, 1931 |

FOREIGN PATENTS

| Number | Country | Date |
|---|---|---|
| 547,853 | British | Sept. 15, 1942 |